United States Patent [19] [11] 4,138,100
Krummenacher [45] Feb. 6, 1979

[54] VICE, PARTICULARLY PARALLEL VICE

[75] Inventor: Josef Krummenacher, Muri, Switzerland

[73] Assignee: Apparate- und Werkzengbau AG, Muri, Switzerland

[21] Appl. No.: 854,002

[22] Filed: Nov. 22, 1977

[30] Foreign Application Priority Data

Nov. 22, 1976 [DE] Fed. Rep. of Germany ....... 2652946

[51] Int. Cl.[2] ........................................ B23Q 3/04

[52] U.S. Cl. .................................... 269/137; 269/194; 269/215; 269/243

[58] Field of Search ................. 269/58, 137, 194, 165, 269/207, 212-215, 243, 252

[56] References Cited

U.S. PATENT DOCUMENTS

| | | | |
|---|---|---|---|
| 540,413 | 6/1895 | Vanderbeek | 269/137 |
| 1,039,337 | 9/1912 | Vanderbeek | 269/165 |
| 2,760,535 | 8/1956 | Mertz | 269/137 |
| 2,889,757 | 6/1959 | Cole | 269/165 |
| 4,049,253 | 9/1977 | Mandel | 269/137 |
| 4,066,250 | 1/1978 | Campbell | 269/252 |

*Primary Examiner*—Robert C. Watson
*Attorney, Agent, or Firm*—Wender, Murase & White

[57] ABSTRACT

This invention relates to a vice, particularly a parallel vice, having a displaceable jaw and at least one fixed jaw, clamping of said displaceable jaw against the fixed jaw being effected by means of a spindle inclined relatively to the displacing direction of the displaceable jaw, and anchoring means of said spindle being rapidly disengageable, shiftable and reengageable with the bed of the vice.

9 Claims, 6 Drawing Figures

VICE, PARTICULARLY PARALLEL VICE

BACKGROUND OF THE INVENTION

This invention relates to a vice, particularly a parallel vice, having at least one jaw displaceable along a bed and two fixed vice jaws. Vices of this type usually have a spindle having its axis parallel to the longitudinal extension of the bed for displacing and clamping said displaceable jaw. Besides the fact that such a spindle usually has an appreciable length, this spindle has to be accessible from one end face of the vice this being a substantial drawback in many cases, for instance when the vice is used for grinding clamped pieces on a machine tool. Displacement of the jaw by means of the spindle through relatively long stretches for adjustment of the jaw to the size of the piece to be clamped is slow and time-consuming.

SUMMARY OF THE INVENTION

It is an object of this invention to allow use of a shorter spindle which is easily accessible and which may be a simple socket head cap screw, and to allow rapid and easy displacement of the displaceable jaw. It is a further object of this invention to provide a vice of high accuracy. The vice of this invention is characterized in that clamping of said displaceable vice jaw is effected by a spindle inclined relatively to the longitudinal extension of said bed, anchoring means for said spindle being disengageable from said bed for adjustment along said bed and reengagement in another place thereof. The spindle is accessible at the top side of the vice and its length is substantially determined by the height of the vice but not by the length of the bed. In order to rapidly shift the displaceable jaw by appreciable stretches the anchorage of the spindle at the bed may be disengaged and reengaged when the displaceable jaw has reached its new position. The displaceable jaw and a workpiece clamped by the same are pulled towards the bed, this resulting in a high stability of the vice and workpiece.

Two embodiments of this invention will now be described by way of an example in detail with reference to the drawings.

DESCRIPTION OF THE PREFERRED EMBODIMENTS

Figure 1:
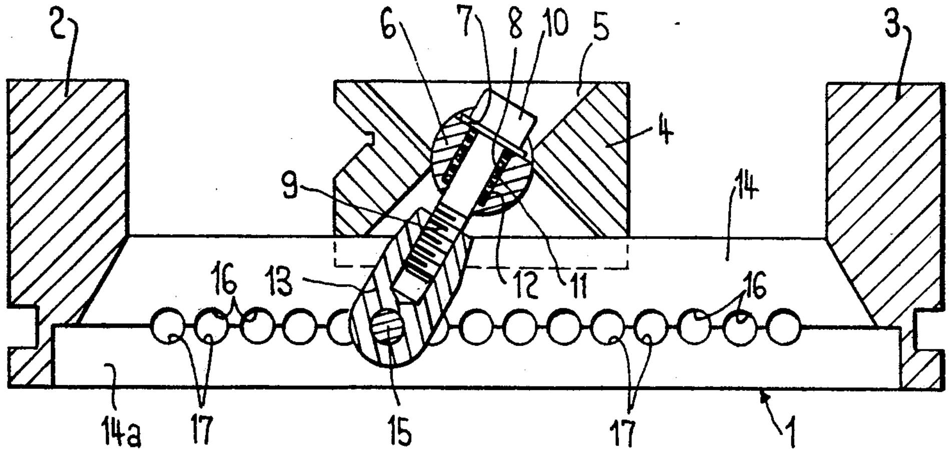
FIG. 1 is a longitudinal sectional view of a first embodiment of a vice according to the present invention.
Figure 2:
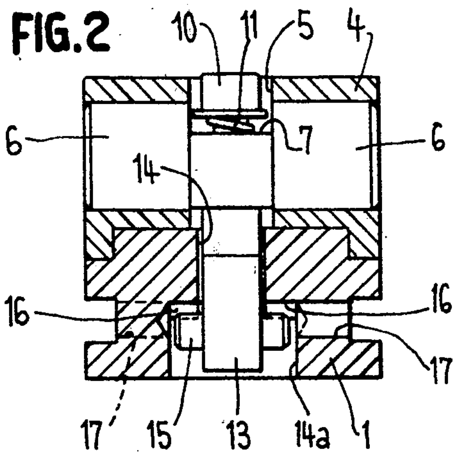
FIG. 2 is a cross sectional view of the embodiment of FIG. 1 taken along the axis of the spindle.

The vice illustated in FIGS. 1 and 2 has a bed 1 which is made in one piece with fixed clamping jaws 2 and 3 or to which such jaws are fixed. The displaceable jaw 4 of the vice is slidably mounted on the slide way of the bed 1, and this slide way may be worked with high precision. The displaceable jaw 4 has a central slit 5 widening towards its ends, this slit receiving the clamping spindle. A shaft 6 is pivoted in the jaw 4, this shaft having a central plane cutting 7. The middle portion of shaft 6 also has a through bore 8 and the spindle or clamping screw 9 extends through this bore. The head 10 of the screw 9 rests on the plane cutting 7, a washer being inserted between this head and the cutting. A pressure spring 11 of which one end rests on a shoulder 12 of bore 8 acts onto the washer and head 10 respectively and tends to shift the screw 9 upwardly. The lower end of screw 9 is screwed into a nut 13 located in a longitudinal slot 14 of the bed 1 and which has a cross pin 15 at its lower end, this pin 15 projecting from each side of the nut 13. This pin 13 is located in a wider lower portion 14*a* of slot 14 and usually engages into grooves 16 opening downwardly and having semi-circular cross section, such grooves 16 being formed at the inner end wall of the lower wider portion 14*a* of slot 14. The grooves or rests 16 are the remaining portions of transverse bores 17 made prior to milling of the lower portion 14*a* of slot 14.

FIG. 1 shows the clamped or spanned state, that is, the screw 9 acting as a clamping or spanning spindle is tightened between the shaft 6 and the nut 13. The inclination of the screw 9 is so designed that by the pull of the screw 9 the displaceable jaw 4 is moved towards the left in FIG. 1 and would clamp a workpiece which is not shown between it and the fixed jaw 2. For loosening the clamping the screw 10 is loosened, whereafter a previously clamped piece may be removed and replaced by a similar piece which may then be clamped by tightening the screw 9. If an appreciably smaller or larger piece has to be clamped subsequently, and it is desirable to rapidly displace the jaw 4 by an appreciable stretch, the screw 9 is loosened to such an extent that the spring 11 lifts the screw head 10 from the cutting 7. The nut 13 is thereby held in the illustrated rest position by the action of spring 11. When the screw 9 is sufficiently loosened the operator presses onto its head 10 whereby the screw 9 is shifted inwardly and downwardly and the nut 13 is disengaged from the rest grooves 16. The screw may now be tilted into substantially vertical position in order to further space the pin 15 of the nut 13 from the grooves 16, whereafter the jaw 4 may be easily and rapidly shifted towards the left or the right into a desired position. If the desired position is reached the screw is brought into inclined position and its head 10 is released such that the screw is pushed upwardly by spring 11 and the pin 15 of the nut 13 now engages into grooves 16. By tightening the screw 9 another part or piece may now be clamped as described above. According to whether the screw 9 is inclined to the right as illustrated or to the left, the displaceable jaw 4 may be urged to the left or to the right in order to clamp a part between it and one of the fixed jaws 2 or 3 respectively.

Figure 4:
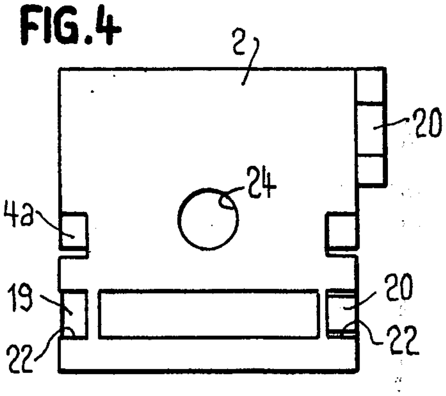
FIG. 4 is a front elevational view of the embodiment of FIG. 3.
Figure 3:
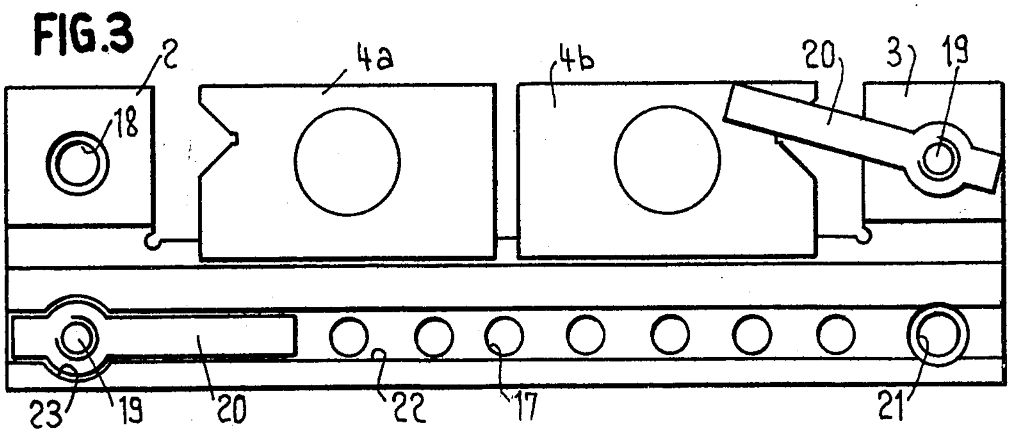
FIG. 3 is a side elevational view of a second embodiment of the vice of this invention.

FIGS. 3 and 4 show another embodiment or modification of the vice, corresponding parts being designated by the same reference numerals as in FIGS. 1 and 2. As shown in FIG. 3 two displaceable clamping jaws 4*a* and 4*b* are provided. The fixed jaws 2 and 3 each have a transverse bore 18 adapted to receive a fixing screw 19 for fixing a stop 20 determining the position of a workpiece to be clamped. Below each fixed jaw there is a transverse bore 21 whithin reach of longitudinal grooves 22. Cylindrical cuttings 23 are provided at the end of each bore 21 such that a stop 20 may be inserted into the groove 22 and cutting 23 respectively as shown at the left in FIG. 3 and on the right in FIG. 4, this stop being fixed by a fixing screw 19 inserted from the opposite side of the vice. It may be seen that stops 20 may be stored in completely countersunk position in the grooves 22 and cuttings 23 such that they do not limit the liberty in mounting the vice, whereby it may be desirable and possible to apply the vice to a support with one of its side surfaces instead of its bottom surface. The stops may be fixed on the jaws 2 and 3 in any one of the four possible positions. The screws 19 have the same head as the screws 9 such that all screws may be actuated by means of the same key and may be interchanged if desired.

Of course stops as illustrated in FIGS. 3 and 4 may also be fixed to the vice shown in FIGS. 1 and 2 provided that the fixed jaws of the same have bores 18.

The high precision or accuracy of the vice has already been mentioned above. Due to the particular clamping or spanning mechanism as shown the accuracy is not affected by stresses in the bed of the vice. These favorable characteristics and the particularly simple shape of the vice allow the use of the same with means for varying its inclination. To this end accurately worked bores 24 may be provided at the front sides of the fixed jaws 2 and 3.

Figure 5:
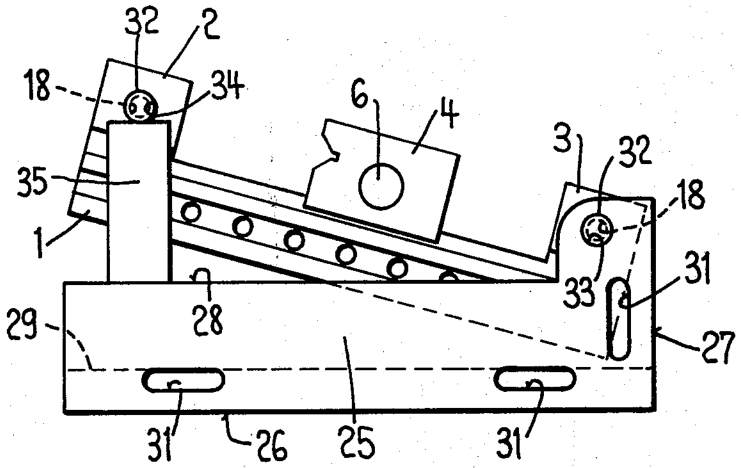
FIGS. 5 and 6 are a side elevational view and a front elevational view, respectively, of a base for use in mounting of the vices of FIG. 1 or 3 in accordance with the present invention.
Figure 6:
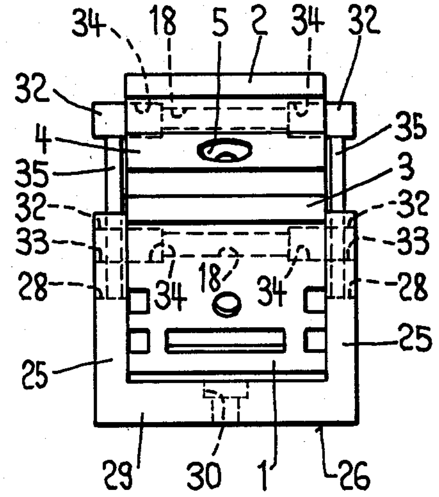

FIGS. 5 and 6 illustrate a vice mounted in a base allowing adjustment of the longitudinal inclination of the vice. This base has substantially L-shaped side portions 25 with accurately worked, plane edge surfaces 26, 27 and 28. The side portions 25 are interconnected by an intermediate portion 29. The base has holes 30 and grooves 31 for fixing it on a support either with surfaces 26 or with surfaces 27. The bed 1 of a vice substantially as shown in FIGS. 1 and 2 but having bores 18 in its fixed jaws 2 and 3 is pivotably mounted in the upstanding wings of the side portions 25 by means of pivot pins 32 inserted into accurately worked bores 33 of the side portions 25 and into accurately worked bore portions 34 of the vice jaw 3. The vice jaw 2 has a similar bore 18 with accurately worked widened bore ends 34 and with cylindrical pins 32 inserted therein. A stop measure 35 or similar gauge is inserted between each pin 32 and the edge surface 28 of the side portions 25, such stop measures determining exactly the inclination of the vice bed 1. In another application pivot pins mounted on a modified base may be inserted into the bores 24 and the bed 1 may be tilted round such pins and may be secured in the desired position by means of a clamping device suitable for determining the desired cross inclination. A similar design is feasible with the vice illustrated in FIGS. 1 and 2. According to the requirements either bores 21 or bores 24 may be omitted.

As may be seen from the drawing, the vice has plane surfaces at its sides and ends as well as at its bottom and at the upper end of the fixed jaws 2 and 3. All these surfaces may be worked very accurately, and the vice may thus be mounted with high precision onto a suitable plane surface with any one of its outer surfaces unless stops 20 are mounted. This brings a high versatility of the vice together with high precision. The vice with a workpiece clamped therein may even be mounted upside down if required.

What is claimed:

1. A vice, particularly a parallel vice, comprising: a bed; at least one vice jaw displaceable along said bed; and two fixed vice jaws disposed each at one end of said bed; a clamping spindle one end of which is swingably mounted in said displaceable jaw, the swinging range of said spindle including positions of the spindle axis inclined to each side from a central position perpendicular to the longitudinal direction of said bed, such that said displaceable jaw may be clamped against each of said fixed vice jaws by tightening said spindle in an inclined position; and anchoring means on the other end of said spindle engageable into rows of anchoring recesses of said bed, said anchoring means being disengageable from said anchoring recesses when said spindle is loosened for fast adjustment of said displaceable jaw with its spindle along said bed.

2. A vice according to claim 1, wherein said anchoring means comprises a nut having coupling projections at its side, such projections removably engaging into said anchoring recesses of said bed.

3. A vice according to claim 1, having two displaceable jaws.

4. A vice according to claim 1, comprising stops mounted on said fixed jaws, said bed having recessed portions at its sides for countersunk accommodation of said stops in said recessed portions.

5. A vice according to claim 4, comprising transversal bores in said fixed jaws and in the bed below said fixed jaws for inserting fixing screws for said stops.

6. A vice according to claim 1, wherein said bed is tiltably mounted on a base.

7. A vice according to claim 6, wherein said bed has bores for receiving pivot shafts and for receiving pins supporting said bed in a determined inclined position.

8. A vice according to claim 1, wherein said bed has plane and accurately worked surfaces at its sides and ends as well as at its bottom and at the upper end of said fixed jaws, such that said plane surfaces constitute mounting surfaces allowing accurate positioning of said bed on a plane support.

9. A vice, particularly a parallel vice, comprising: a bed; at least one jaw displaceable along said bed towards at least one fixed jaw, clamping of said displaceable vice jaw against said fixed jaw being effected by means of a spindle mounted on said displaceable vice jaw and inclined relatively to the longitudinal extension of said bed; anchoring means on said spindle and disengageable from anchoring recesses of said bed for adjustment along said bed and reengagement in another place thereof; an accessible outer end of said spindle forming a head adapted to be pressed against said displaceable jaw for exerting a clamping force against said fixed jaw, a pressure spring inserted between said head and said displaceable jaw, said spring keeping said anchoring means of the spindle in engagement with said anchoring recesses of the bed when the spindle is loosened, and said anchoring means of the spindle being disengageable from said anchoring recesses by pressure onto the spindle when loosened and compression of said pressure spring for shifting said anchoring means to other anchoring recesses.

* * * * *